Nov. 27, 1928.  1,693,153
J. A. MURPHEY
AUTOMOBILE STEERING WHEEL HUB
Filed Jan. 6, 1926   3 Sheets-Sheet 1
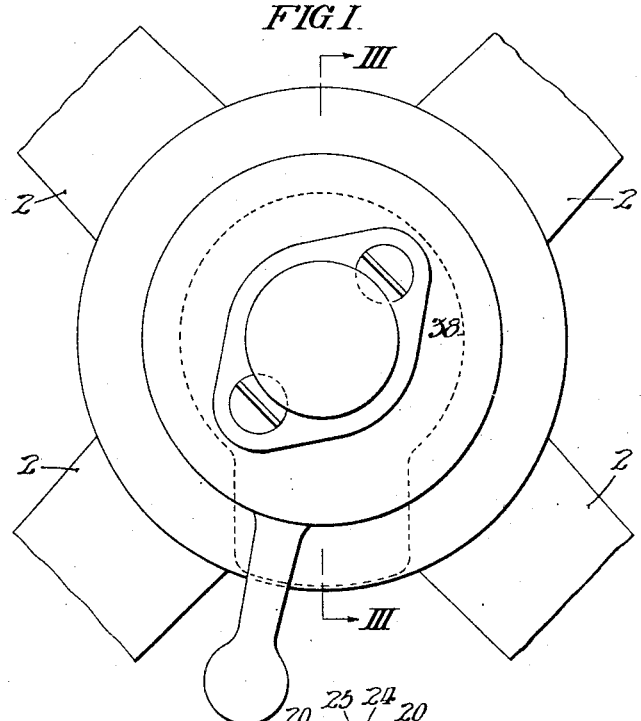
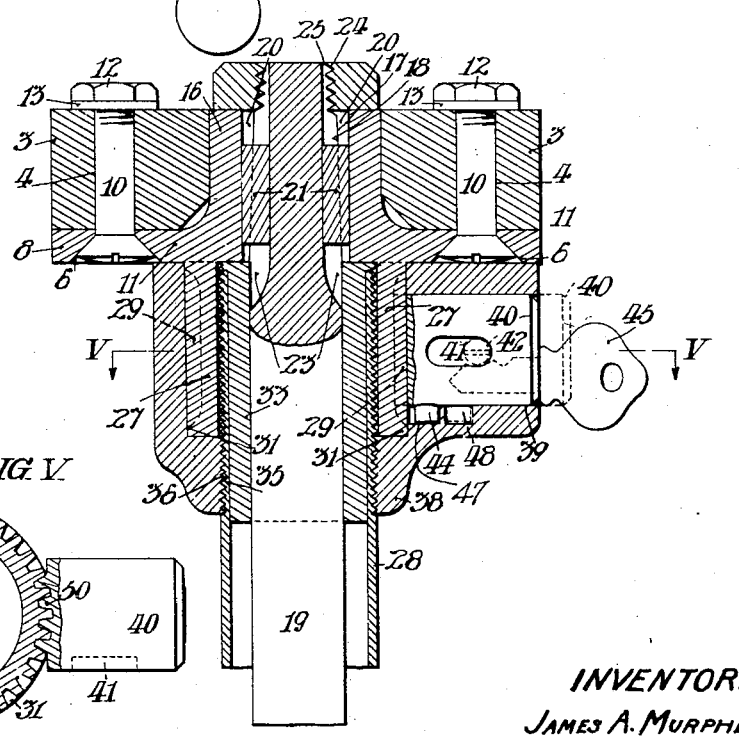
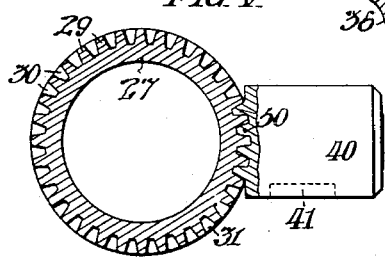
INVENTOR:
JAMES A. MURPHEY, Nov. 27, 1928. 1,693,153
J. A. MURPHEY
AUTOMOBILE STEERING WHEEL HUB
Filed Jan. 6, 1926   3 Sheets-Sheet 2
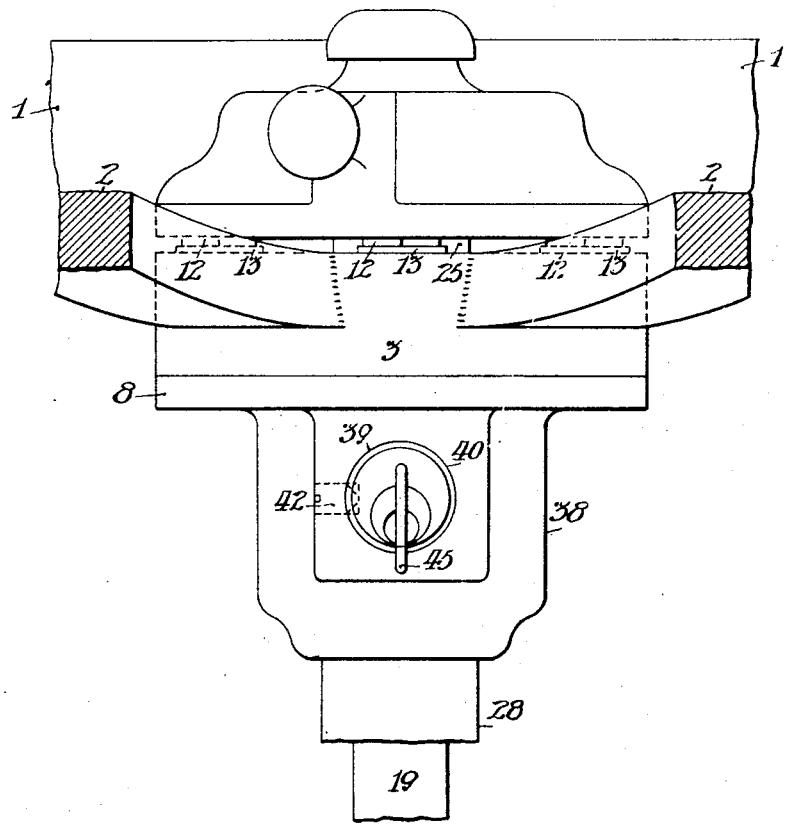
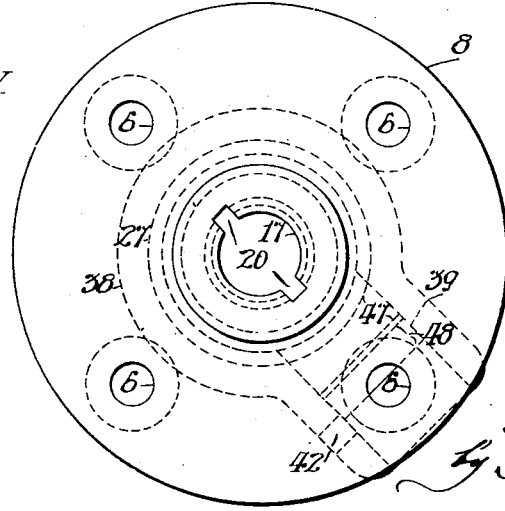
INVENTOR:
JAMES A. MURPHEY,

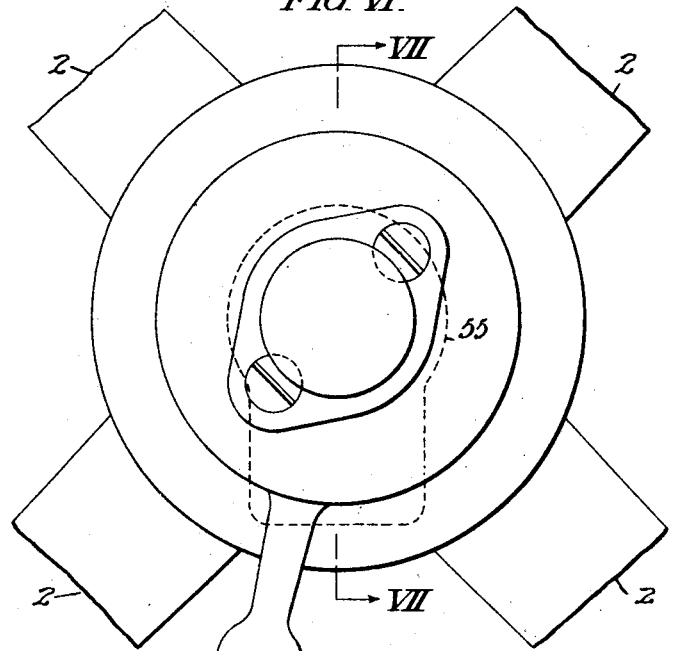
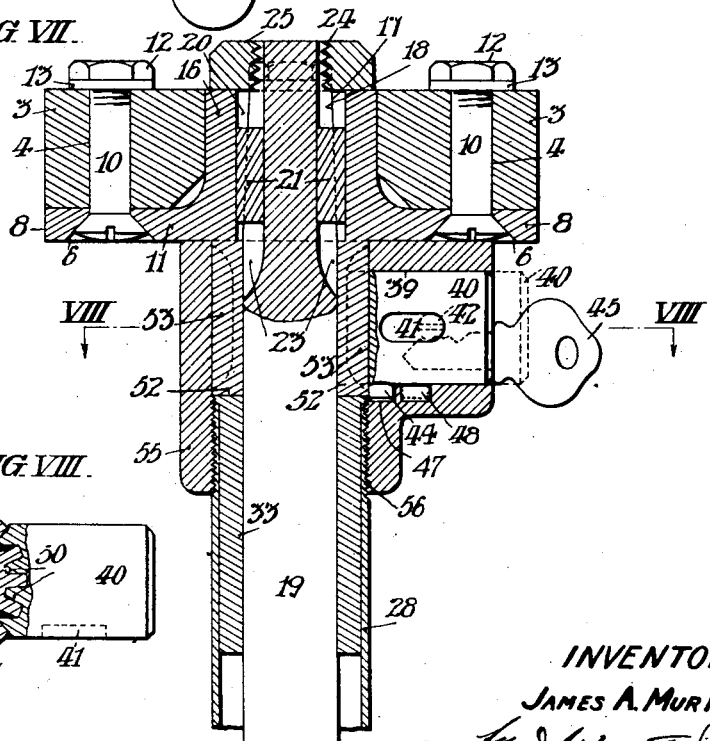
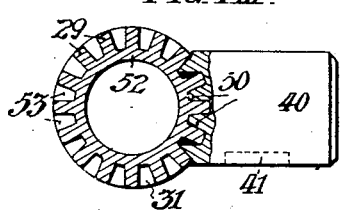

Patented Nov. 27, 1928.

1,693,153

UNITED STATES PATENT OFFICE.

JAMES A. MURPHEY, OF GERMANTOWN, PENNSYLVANIA.

AUTOMOBILE STEERING-WHEEL HUB.

Application filed January 6, 1926. Serial No. 79,546.

This invention relates to mechanism of the general type described and claimed in Letters Patent of the United States 1,425,408, granted to me August 8, 1922, including locking means for detachably rigidly connecting the steering shaft of a self-propelled vehicle with the stationary bearing tubular column inclosing such shaft, so as to prevent the vehicle from being steered when locked; such locking means being mounted in a stationary casing which is rigidly connected with said bearing column. The specific form of my invention shown in said Letters Patent is adapted solely for connection with automobiles of the "Ford" type, including a planetary steering gear case at the top of the stationary bearing tube inclosing the steering shaft, and the locking means includes a radially reciprocatory cylindrical lock body, so constructed and arranged that it was necessary to provide the steering shaft with a sleeve having recesses of the full diameter of the lock body. That locking mechanism is entirely independent of the steering wheel; so that the ordinary "Ford" wheel may be readily applied to and removed therefrom, regardless of whether the locking mechanism is in locked position or not.

The object and effect of my present invention is to make an accessory which is adapted for connection with automobiles wherein the stationary steering column is a straight cylindrical tube, without any gear casing at the top thereof, and to avoid the expense of constructing and fitting such a sleeve by providing a steering wheel with a hub having a circular series of gear teeth formed upon the exterior thereof with spaces between such teeth, terminating above the lower end of said hub, and providing a radially reciprocatory lock body with an arcuate series of gear teeth formed upon the inner end thereof, adapted to engage the teeth in said hub when in locked position. That is to say, in my present invention, the steering wheel is of a special form and becomes a part of the locking mechanism; whereby both relative axial and revolutionary movement of said hub and steering shaft and stationary bearing column are prevented when said lock is in locked position.

My invention includes the various novel features of construction and arrangement hereinafter more definitely specified.

In the drawings; Fig. I is a fragmentary plan view of a steering wheel and its appurtenances, of the present type used in "Franklin" automobiles, but includes a convenient embodiment of my invention, wherein the lock casing is in unitary relation with a cap screwed upon the top of the stationary straight cylindrical tubular steering column with which such cars are equipped.

Fig. II is a fragmentary elevation of said structure.

Fig. III is a fragmentary vertical sectional view of said structure, taken on the line III, III in Fig. I.

Fig. IV is a plan view of the unitary wheel hub and lock casing.

Fig. V is a fragmentary plan sectional view of the wheel hub and radially reciprocatory lock body engaged therewith, taken on the line V, V in Fig. III.

Fig. VI is a fragmentary plan view, similar to Fig. I, but including a modified form of my invention.

Fig. VII is a fragmentary vertical sectional view, taken on the line VII, VII in Fig. VI.

Fig. VIII is a fragmentary plan sectional view of the wheel hub and radially reciprocatory lock body engaged therewith, taken on the line VIII, VIII in Fig. VII.

In the form of my invention shown in Figs. I to V inclusive; the steering wheel comprises the rim 1, spokes 2 and hub ring 3, conveniently formed entirely of wood. Said hub ring has a series of four bolt openings 4 therethrough respectively in registry with the bolt openings 6 in the metallic hub 8. As shown in Fig. III, said openings 4 and 6 are adapted to receive bolts 10 having heads countersunk in the flange 11 of said metallic hub 8, and having nuts 12 and spring washers 13 above said hub ring 3.

It is to be understood that said steering wheel is rigidly connected with its metallic hub 8 by the means above described. Said hub has the upper axial boss 16 with the conical bore 17 fitted to the upper conical end 18 of the steering shaft 19, and with diametrically opposite keyways 20 for the keys 21 which extend into the keyways 23 in said shaft, as shown in Fig. III. The upper end of said shaft 19 has the screw thread 24 for engagement with the nut 25; whereby said shaft 19 is rigidly connected with said steering wheel.

Said hub 8 has the tubular skirt flange 27 overhanging the stationary bearing column 28, in coaxial, spaced, relation with said shaft 19. Said hub flange 27 has the circular series of gear teeth 29 formed upon the exterior thereof, with spaces 30 between such teeth;

said spaces terminating above the lower end of said hub; thus leaving a retaining ledge 31 at the lower end of said hub 8, to prevent removal of the wheel when locked.

As shown in Fig. III; said steering shaft 19 is journaled in the bearing bushing 33 in said stationary column 28. Said column has the external screw thread 35 at the top thereof for engagement with the internal screw thread 36 of the lock casing 38 which is thus held in stationary position, as a cap, upon the top of said column 28. Said casing 38 has the radial lock socket 39, conveniently presented directly in front of the operator and in which the cylindrical lock body 40 is mounted to reciprocate radially, to the extent limited by the slot 41 therein, in which extends the screw 42 which is in threaded engagement with the side wall of said lock casing, as indicated in dotted lines in Fig. II. Said lock is conveniently of the pin tumbler type and includes the locking plunger 44 which is adapted to be retracted and projected by turning movement of the key 45, so as to alternately engage the locking recesses 47 and 48, respectively in the locked position shown in Fig. III in full lines, and in the unlocked position indicated in that figure in dotted lines.

As best shown in Fig. V; said lock body 40 has an arcuate series of teeth 50 formed thereon at its inner end for engagement in the tooth recesses 30 in said wheel hub 8. As indicated in Fig. III; said tooth recesses 30 are adapted to be formed by a milling cutter rotating upon an axis at right angles to the axis of said hub 8, and are so shaped that when the lock 40 is in the locked position shown in Fig. III; said hub 8 cannot be withdrawn therefrom, even if said nut 25 be removed from the steering shaft 19. Consequently, in said locked position of the device, it is impossible to remove said lock casing 38 from said column 28. If an attempt be made to unscrew said casing 38 by forcibly turning the steering wheel when the device is locked; of course, such rotary movement is limited to the arc through which the front wheels may be turned which is a fraction of a revolution.

It is to be understood that, during the normal operation of the vehicle, said steering wheel and its shaft 19 may be freely turned by the operator; the hub 8 resting upon the top of said column 28 and said lock 40 being in the unlocked position indicated in Fig. III. However, when it is desired to prevent the vehicle from being steered; said steering wheel and shaft may be locked in any desired position of rotation, by thrusting said lock 40 into the inner locked position shown in full lines in Figs. III and V. Said teeth 29 are so small, in circumferential extent, that such locking may not only be effected with the front wheels of the vehicle in any desired position; for instance, with said wheels turned toward a street curb, upon either side of the vehicle, but may be effected much more conveniently than in the form of my invention shown in said Letters Patent.

Therefore, both relative axial and revolutionary movement of said hub and steering shaft and column are prevented, when said lock 40 is in the locked position shown in full lines in Fig. III; thus not only locking the steering mechanism so that the automobile cannot be operated, but preventing theft of the steering wheel.

The form of my invention above described with reference to Figs. I to V inclusive, may be substituted for the stock wheel furnished with the automobile contemplated, without any change in the construction of the latter, except to provide the upper end of the stationary steering column 28 with said screw thread 35. However, a simpler, and consequently less costly, embodiment of my invention may be employed as illustrated in Figs. VI to VIII inclusive; the principal difference between the two forms being that the tubular hub flange 52 provided with the locking recesses 53 is presented in alinement with the stationary steering column 28 instead of overhanging the exterior thereof. That form of my invention is advantageous in that the lock casing 55 may be made smaller in diameter than the lock casing 38 and that the screw thread 56 at the top of the column is of less axial extent that the screw thread 35 required for said casing 38. However, in the form of my invention shown in Fig. VII, the column 28 must be shorter, in proportion to the length of the steering shaft 19, to allow for the interposition of the hub 52 in alinement with said column, between the top of the column and the under side of the wheel and, consequently, that form of my invention is adapted for inclusion in the primary construction of automobiles rather than as an accessory to previously constructed automobiles of standard form.

Although I have shown both forms of my invention aforesaid including a specific form of steering wheel adapted for wooden construction; it is to be understood that any suitable form of steering wheel may be employed; if it is provided with a hub with suitable locking recesses, similar to the hubs 8 and 52 above described.

Therefore, I do not desire to limit myself to the precise details of construction and arrangement herein set forth, as it is obvious that various modifications may be made therein without departing from the essential features of my invention, as defined in the appended claims.

I claim:

1. An article of manufacture consisting of a single unitary structure forming a hub for a steering wheel of an automobile, and having an axial opening therethru adapted to rigidly fit a steering shaft in coaxial relation therewith; an annular flange on said hub, intermediate of its length, adapted to form a protective covering for hub locking means; means on said flange, including a circular series of holes for fastening means, arranged to rigidly connect it with the spokes of a steering wheel; and a tubular skirt flange, depending from said annular flange, having a circular series of gear teeth formed upon the exterior thereof, and terminating above the lower end of said hub; whereby, said hub is adapted to be held stationary by said hub locking means, in any selected position of rotation.

2. An article of manufacture consisting of a single unitary structure forming a hub for a steering wheel of an automobile, and having an axial opening therethru adapted to rigidly fit a steering shaft in coaxial relation therewith; an annular flange on said hub, intermediate of its length, adapted to form a protective covering for hub locking means; and a tubular skirt flange, depending from said annular flange, having a circular series of gear teeth formed upon the exterior thereof and terminating above the lower end of said hub; whereby, said hub is adapted to be held stationary by said hub locking means, in any selected position of rotation.

In testimony whereof, I have hereunto signed my name at Philadelphia, Pennsylvania, this second day of January, 1926.

JAMES A. MURPHEY.